J. M. LARSON.
TEMPERATURE REGULATING APPARATUS.
APPLICATION FILED SEPT. 18, 1909.
1,019,496.
Patented Mar. 5, 1912.
2 SHEETS—SHEET 1.
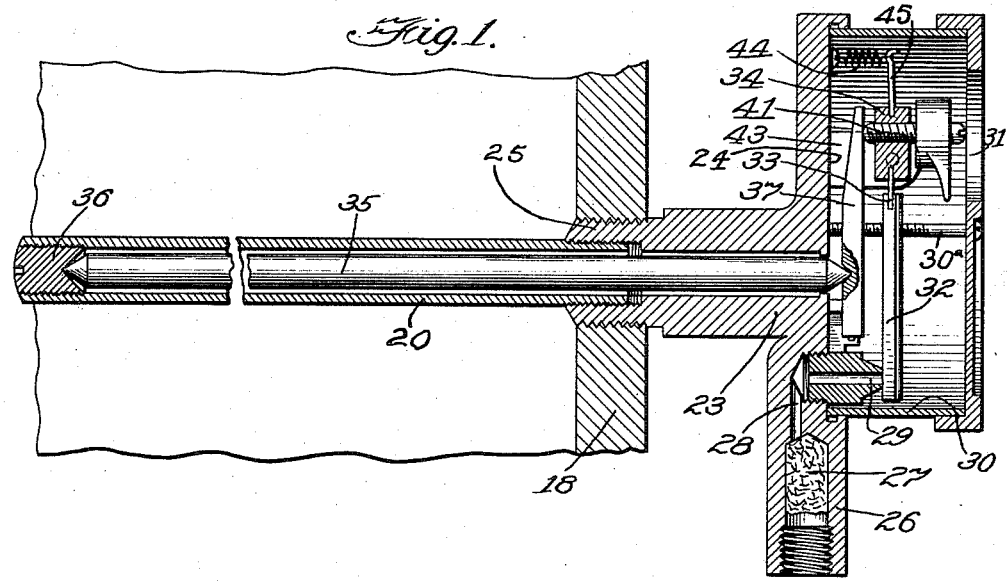
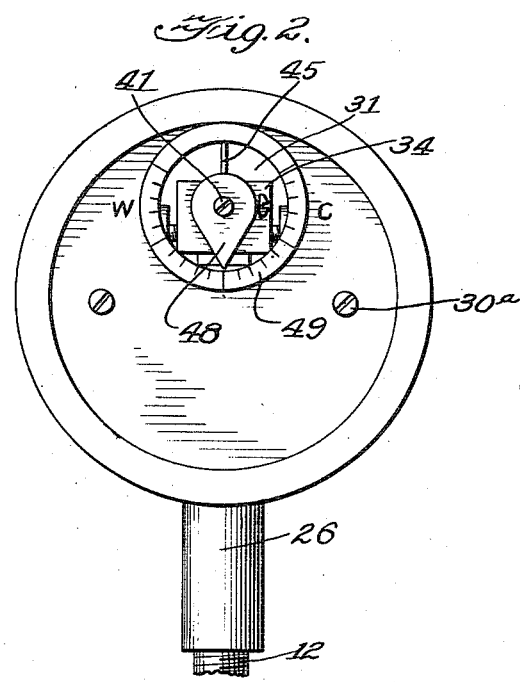
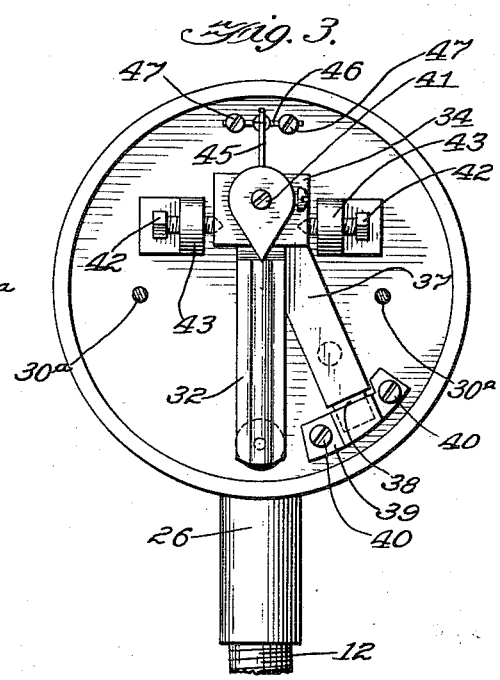
Witnesses:—
Wm H. Yagle.
C. L. Hopkins.
Inventor:—
John M. Larson,
by Jones, Addington & Ames,
Attys.

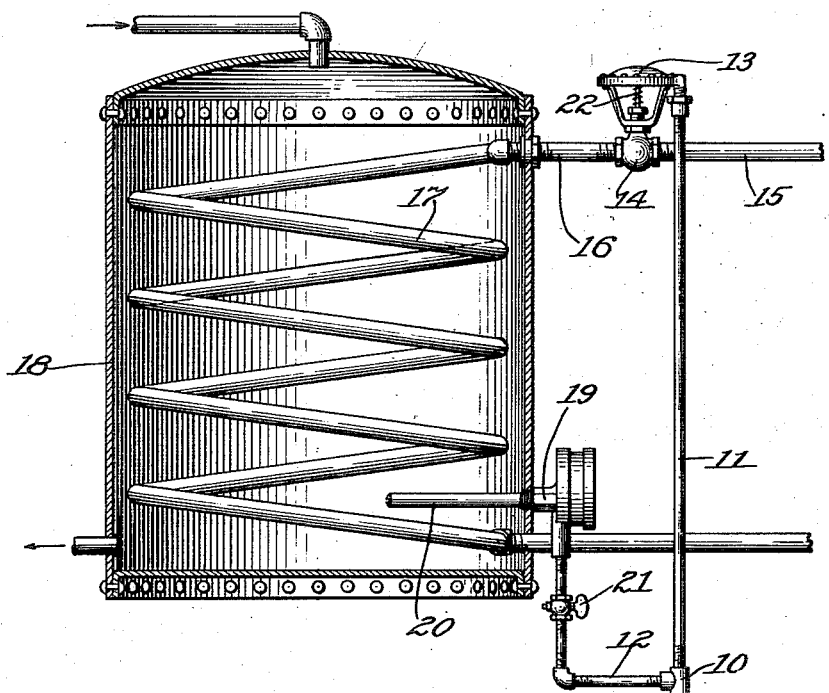
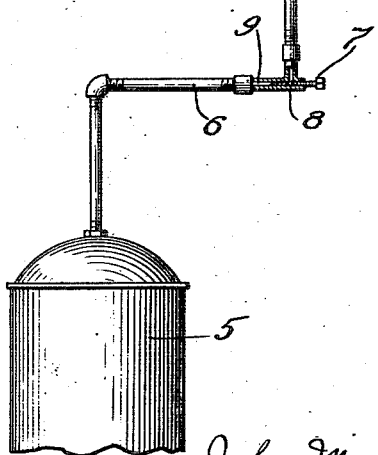
Fig. 4.

UNITED STATES PATENT OFFICE.

JOHN M. LARSON, OF CHICAGO, ILLINOIS, ASSIGNOR TO NATIONAL REGULATOR COMPANY, OF CHICAGO, ILLINOIS, A CORPORATION OF ILLINOIS.

TEMPERATURE-REGULATING APPARATUS.

1,019,496.        Specification of Letters Patent.      Patented Mar. 5, 1912.

Application filed September 18, 1909. Serial No. 518,435.

*To all whom it may concern:*

Be it known that I, JOHN M. LARSON, a citizen of the United States, residing at Chicago, in the county of Cook and State of Illinois, have invented new and useful Improvements in Temperature-Regulating Apparatus, of which the following is a full, clear, concise, and exact description, reference being had to the accompanying drawing, forming a part of this specification.

This invention relates to improvements in temperature regulating apparatus of that class wherein fluid under pressure, such as compressed air, is employed to operate a diaphragm motor which controls the flow of a heating or cooling medium, the motor being in turn controlled by a device which is capable of being affected by temperature changes and which is exposed to such changes at a place where the temperature is to be maintained constant.

More particularly, this invention relates to a "graduated action" as distinguished from a "positive action" thermostatic device, that is, it relates to a device in which the diaphragm of the motor is held stationary at an intermediate position so long as the temperature to which the thermostat is exposed remains constant.

The principal object of the invention is to provide a thermostatically actuated controlling device of the "graduated action" type in which the lowering of the temperature at the place at which it is desired to maintain the same at or near a fixed point may so affect the thermostatic element as to cause it to close a waste port and thus change the pressure to which the diaphragm of the motor is subjected.

In the accompanying drawings—Figure 1 is a vertical sectional view of the thermostatic controlling device of my invention; Fig. 2 is a front elevational view of the same; Fig. 3 is a view similar to Fig. 2 but with the cover or casing which incloses the front of the device removed; and Fig. 4 is a view, partly in section, of a system for cooling the contents of a tank, in which system my device is employed to govern the flow of a cooling medium through a coil of pipe.

In the several figures of the drawings, 5 represents a source of supply of fluid under pressure, such as a tank containing compressed air. From this tank leads a pipe 6, this pipe containing, at some convenient point, means for restricting the flow of air therethrough, said means may conveniently comprise a screw 7 which, by being adjusted in and out in a casing 8, closes more or less a passage 9 through which the air flows. The pipe 6 divides at a point beyond the restriction, as at 10, into two branches 11 and 12 respectively. The branch 11 leads to a diaphragm motor 13 of well known construction which is arranged to open and close a valve 14 as usual. A pipe 15, carrying a cooling medium such as cold brine or the like, enters the casing of the valve 14 upon its inlet side. From the outlet side of the valve leads a pipe 16 to the cooling coil 17 which is located in the tank 18, the contents of which are to be maintained at a given low temperature. The pipe 12 leads to the thermostatic controlling device 19, the thermostatic element 20 of which extends into the tank so as to be affected by changes in the temperature of the contents of the tank. If desired a suitable hand valve 21 may be interposed in the pipe 12, whereby communication between the controlling device 19 and the source of supply of fluid under pressure may be cut off if desired, but under all ordinary conditions this valve will be left open and may be dispensed with if desired. It will be seen that the thermostatic device 19, being located at the end of the branch 12 may, by regulating the amount of air which is permitted to flow through this pipe and waste to the atmosphere, govern the pressure in the motor 13. If the thermostatic device permits no air at all to escape to the atmosphere the air which passes the restricting screw 7 will all go to the motor 13 and in time the pressure at the motor will become equal to that at the tank 5. If, on the other hand, the thermostatic device permits to escape to the atmosphere all of the air that can pass through the restriction the pressure in the motor will become nothing and the spring 22 thereof will raise the valve from its seat to the limit and completely open said valve. It is by maintaining a certain ratio between the pressure at the motor and at the tank, by permitting a certain proportion of the air which passes the restriction to escape to the atmosphere, that the valve is held at a given position and the regulation of the flow of cooling medium is effected. This automatic regulation of the amount of air which wastes to the atmosphere through the pipe 12 is accomplished by means of the thermostatic controlling device 19, which device is illustrated in detail in Figs. 1, 2 and 3.

The controlling device comprises a head 23 on the front or face 24 of which are mounted certain instrumentalities inclosed within a suitable casing, and from the rear of which extends an externally screw-threaded shank 25. The thermostatic element 20 consists of an elongated tube, preferably of brass or other metal, extending rearward from the head, being screwed into the shank 25. The shank 25 is inserted into a screw-threaded opening in the wall of the tank 18 so that the thermostatic element extends inwardly from said wall while the head 23 and the mechanism mounted thereon are located outside the tank. A tubular extension or neck 26 extends downward from the head 23 and is internally threaded for the reception of the pipe 12. Suitable material 27 such as cotton or the like, for straining out dirt which may have passed along the pipes of the system, may be arranged in the neck 26 if desired. A passage 28 leads from the neck to an inlet port 29 through which air from the pipe 12 escapes. A suitable cover 30 incloses the face or front of the head and protects the parts which are mounted thereon, this cover having an opening 31 through which access may be gained in regulating the device, the space within the cover 30 being in free communication with the atmosphere because of the presence of this opening. A valve 32 is arranged to cover, when seated, the outlet port 29, this valve being hung upon a flexible hinge consisting of a plate spring 33, one end of which is secured to the valve and the opposite end of which is secured to a short lever 34. The plate spring 33 tends to resist movement of the valve toward one side or the other of a given position with relation to the lever 34.

Extending longitudinally through the tubular thermostat 20 is a rod 35, one end of which is seated against a threaded plug 36 which screws into the rear end of the thermostatic tube. The front end of this rod 35 extends beyond the face 24 and bears upon a lever 37 of the third class, this lever being fulcrumed by means of a metallic strip 38 to a standard 39 which is secured, as by means of screws 40, to the face 24.

The opposite end of the lever bears against the end of a screw 41 which extends through the lever 34. The lever 34 is of the first class and is fulcrumed upon the points of a pair of screws 42 which extend toward each other through suitable lugs 43 which project from the face 24. A light spring 44 is secured at one of its ends to a light rod 45 which extends upward from the lever 34, the opposite end of this spring being secured to a short piece of wire 46 which is secured to the face of the head by means of small screws 47. The tendency of this spring is to swing the lever 34 in the direction which would carry the valve 32 away from its seat and thus uncover the waste port 29. The tendency of the compressed air issuing or attempting to issue from the waste port is also to move the valve away from its seat. This tendency is, however, resisted by the pressure of the lever 37 against the end of the screw 41. The contraction of the tubular thermostatic element 20, due to the lowering of the temperature of the surrounding medium, causes the rod 35 to thrust more forcibly against the lever 37 and therefore increases the pressure of the lever 37 upon the lever 34. It is evident that the lower the temperature to which the tube 20 is subjected the greater will be the pressure exerted by the lever 37 upon the lever 34, and consequently the greater the force which is applied in pressing the valve toward its seat. It will be observed also, however, that as the connection between the lever 34 and the valve 32 is a yielding one rather than a rigid one, the valve is not held positively at a fixed position for a given position of these levers, because the air which issues or attempts to issue from the port 29 may flex the spring 33. The spring 33 is thus made to constitute an energy-storing means in which power is accumulated for closing the waste port, the amount of power which is stored therein being altered by changes in the length of the thermostatic element, due to the temperature changes to which said element is exposed.

In order to provide means for adjusting the pressure which is exerted by the lever 37 upon the lever 34 with the temperature at a given point and consequently the thermostat having a given length the screw 41 is provided with a pointer 48, which is accessible through the opening 31 in the front of the cover, and by means of which the screw may be turned in or out in the lever 34. This pointer moves over a suitable scale 49 marked on the cover and lettered W and C respectively at its ends. These letters are abbreviations for the words "warmer" and "cooler" respectively. By thus adjusting the pressure which the lever 37 exerts upon the lever 34 under a given temperature condition the temperature point at which the contents of the tank 18 will be maintained, may be adjusted.

If the temperature of the contents of the tank begins to rise above the desired point the pressure exerted by the lever 37 upon the lever 34 decreases, the amount of energy which is stored in the plate spring 33 being thereby lessened, and the tendency of the valve to approach its seat, therefore, becoming less. This permits the air issuing from the port to blow the valve farther away from the port, this action being assisted by the spring 44. An increased flow or waste of air through the waste port 29 follows and results in a lowering of the pressure which exists in the chamber of the motor 13. This lowering of the pressure in the motor permits the spring 22 to open the valve to an increased extent until the tension of the spring is again balanced by the pressure in the motor. The flow of the cooling medium through the coil 17 is now increased and the temperature of the contents of the tank begins to fall. When the temperature falls to that which it is desired to maintain the pressure of the lever 37 upon the lever 34 becomes greater, due to the contraction of the thermostatic element, and more energy is stored in the spring 33, the resistance to the escape of air through the waste port 29 being increased and the valve being held more closely to its seat. The pressure in the pipes 11 and 12, as well as that in the chamber of the motor 13, rises until the power of the spring 22 is again balanced by the pressure in the motor. The valve 14 will now remain open at a given position so long as the temperature to which the thermostat 20 is exposed remains stationary. A rise or fall of temperature within the tank 18, by changing the length of the thermostat and consequently the pressure exerted by the lever 37 upon the lever 34, alters the force which the spring 33 exerts to move the valve toward its seat. This results in a change in the amount of air which is allowed to waste to the atmosphere and consequently in the degree of pressure existing in the motor and pipes leading thereto. This change in pressure in the motor is attended by a change in the resistance which is offered to the action of the spring 22 of the motor in holding the valve 14 open, whereby the valve is caused to move to and take a new position at which the spring and the air pressure in the motor will again balance each other. This new position of the valve 14 alters the rapidity of circulation of the cooling medium through the coil 17 and results in the temperature of the contents of the tank being brought to the desired point. In practice the movements of the valve 32 and diaphragm valve 14 are usually exceedingly slow.

Having thus described my invention, what I claim as new and desire to secure by Letters Patent, is:

1. The combination with a motor and a source of supply of fluid under pressure, of means for governing said motor, said means having a waste port, a valve closing against the flow from said port, a spring supporting said valve, a lever to which said spring is secured, means secured to said lever normally tending to unseat said valve, an adjusting screw carried by said lever, a second lever bearing upon said screw, a rod thrusting against said second lever, and a tubular thermostat inclosing said rod and arranged to thrust said rod toward said second lever when the temperature of the medium surrounding said thermostat falls.

2. The combination with a motor and a source of supply of fluid under pressure, of means for governing said motor, said means having a waste port, a valve closing against the flow from said port, a spring supporting said valve, a lever to which said spring is secured, a rod mounted thereon, a spring secured to said rod and normally tending to unseat said valve, an adjusting screw carried by said lever, a second lever bearing upon said screw, a rod thrusting against said second lever, and a tubular thermostat inclosing said rod and arranged to thrust said rod toward said second lever upon a change in the temperature of the medium surrounding said thermostat.

3. The combination with a motor and a source of supply of fluid under pressure, of means for governing said motor, said means comprising a head having a shank screw-threaded for insertion into a threaded opening, a thermostat extending from said shank, said head having a waste port in communication with said motor, a valve for closing said port against the flow of fluid therefrom, a lever supported by said head, connection between said lever and said thermostat whereby contraction of the thermostat moves said lever, and resilient connection between said lever and said valve and a spring in connection with said lever normally tending to hold said valve in closed position.

4. The combination with a motor and a source of supply of fluid under pressure, of means for governing said motor, said means comprising a head having a shank screw-threaded for insertion into a threaded opening, a thermostat extending from said shank, said head having a waste port in communication with said motor, a valve for closing said port against the flow of fluid therefrom, a rod extending from said thermostat through an opening in said head, resilient connection between said rod and said valve, and an adjusting screw accessible from the front of said head for varying the effect of the movement of said rod upon said valve and a spring in connection with said lever normally tending to hold said valve in closed position.

In witness whereof, I have hereunto subscribed my name in the presence of two witnesses.

JOHN M. LARSON.

Witnesses:
M. S. FARRAR,
CHARLES L. HOPKINS.